United States Patent

Meijs et al.

[11] Patent Number: 5,981,615
[45] Date of Patent: Nov. 9, 1999

[54] POLYMERIZABLE SILOXANE MACROMONOMERS

[75] Inventors: Gordon Francis Meijs, Murrumbeena; Bronwyn Glenice Laycock, Heidelberg Heights, both of Australia

[73] Assignees: CIBA Vision Corporation, Duluth, Ga.; Commonwealth Scientific and Industrial Research Organsation, Campbell, Austria

[21] Appl. No.: 08/981,077

[22] PCT Filed: Jun. 4, 1996

[86] PCT No.: PCT/EP96/02421

§ 371 Date: Mar. 9, 1998

§ 102(e) Date: Mar. 9, 1998

[87] PCT Pub. No.: WO97/00274

PCT Pub. Date: Jan. 3, 1997

[30] Foreign Application Priority Data

Jun. 14, 1995 [AU] Australia ................................ PN 3545

[51] Int. Cl.⁶ .................. C08F 290/06; C08G 15/50; C08G 18/61; G02B 1/04
[52] U.S. Cl. .................. 522/137; 522/139; 522/140; 522/141; 522/142; 522/144; 522/148; 351/159; 351/160 R; 351/160 H
[58] Field of Search ................ 522/99, 135, 136, 522/137, 139, 140, 141, 142, 144, 148; 351/159, 160 R, 160 H

[56] References Cited

FOREIGN PATENT DOCUMENTS

| | | |
|---|---|---|
| 0 330 617 A1 | 2/1989 | European Pat. Off. . |
| 0 330 618 A2 | 2/1989 | European Pat. Off. . |
| 0 584 764 A1 | 8/1993 | European Pat. Off. . |
| 0 584 826 A2 | 8/1993 | European Pat. Off. . |
| WO94/15980 | 7/1994 | WIPO . |

*Primary Examiner*—Nathan M. Nutter
*Attorney, Agent, or Firm*—Michael U. Lee

[57] ABSTRACT

A macromonomer of the formula I is described:

$$Q-B(L-B)_nT \qquad (I)$$

wherein n is zero or at least 1.0;

Q is a polymerizable group;

B may be the same or different and is a difunctional block of molecular weight in the range of from 100 to 8000 and wherein at least one B is a residue from a difunctional polymer or copolymer wherein B has a molecular weight of 248 to 8000 comprising silicone repeat units of formula II

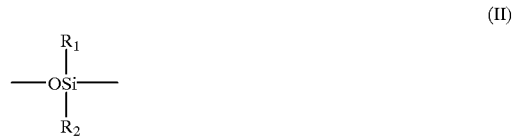

where $R_1$ and $R_2$ may be the same or different and are selected from the group consisting of hydrogen, alkyl, alkenyl, alkynyl, aryl, haloalkyl, haloalkenyl, haloalkynyl, haloaryl, heterocyclyl and haloheterocyclyl;

L is a difunctional linking group; and

T is a terminal group.

The macromonomer may be used preferably in the production of contact lenses.

30 Claims, No Drawings

POLYMERIZABLE SILOXANE MACROMONOMERS

This application claims priority under 35 USC 371 of PCT/EP 96/02421, filed Jun. 4, 1996.

The invention relates to macromonomers, polymers and polymeric articles particularly suited for ocular applications and as cell growth substrates. More specifically this invention relates to polymers that are suitable for use in contact lenses, and opthalmic devices, such as epikeratoprostheses.

A wide variety of research has been conducted in the field of biocompatible polymers. The definition of biocompatible depends on the particular application for which the polymer is designed. In order to properly function as a contact lens a material must have a variety of properties including biological and chemical inertness, mechanical stability, optical transparency, oxygen permeability, and tear wettability. It is particularly advantageous for a contact lens to be able to transmit oxygen to the cornea and to be soft and comfortable to permit wear for extended periods. In order to function properly as a corneal implant, such as an epikeratoprosthesis, the polymer, in addition, must allow adhesion and growth of corneal epithelium and be highly biostable as an implant.

Contact lenses can be classified into hard and rigid contact lenses, such as those manufactured from poly (methyl methacrylate), and soft flexible contact lenses such as those manufactured from poly(2-hydroxyethyl methacrylate). Both of these basic types of contact lenses suffer from various limitations. Hard and rigid contact lenses are uncomfortable to wear and thus are not well-tolerated by some patients. Although poly(methyl methacrylate) hard lenses allow the transmission of virtually no oxygen through the lens to support the cornea, there are some classes of rigid lenses that do allow good oxygen passage, for example, silicon-based materials. Notwithstanding this, they suffer from the aforesaid limitation of poor comfort due to their lack of softness. For optimum comfort and handling, the modulus of elasticity of the lens material would be from 0.5 to 5.0 MPa, preferably from 1.0 to 2.5 MPa.

Conventional soft contact lenses suffer from the disadvantage that there is insufficient oxygen transmissibility through the lens to support normal corneal physiology. Accordingly, they cannot be worn continuously for extended periods. Clinical symptoms of this lens-induced hypoxia include limbal redness and corneal swelling. Ocular infection may result from extended hypoxia induced by contact lens wear. A minimum oxygen transmissibility would be above 50 Barrer, preferably above 70 Barrer, more preferably above 87 Barrer for continuous wear.

There is a long felt need for durable contact lens materials that combine the comfort of a soft contact lens with an oxygen transmissibility sufficient to maintain normal corneal physiology. In one aspect the present invention provides materials which address this need.

Contact lenses should be comfortable and suitable for use over extended periods. In order to achieve comfort over extended periods a lens must principally have a low modulus of elasticity (that is, be soft). In addition, it is desirable that it be resistant to fouling by proteins, lipids, mucoids and the like. However, contact lenses must also be of sufficient durability to allow for handling and normal use.

Thus, there is required a polymer which possesses the combination of high oxygen permeability and a low modulus. We have now found a macromonomer which is suitable for use in the manufacture of such polymers. Accordingly, in its main aspect, this invention provides a macromonomer of the formula I:

$$Q-B(L-B)_n T \quad (I)$$

wherein n is zero or at least 1.0, preferably at least 1.0;

Q is a polymerizable group;

B may be the same or different and is a difunctional block of molecular weight in the range of from 100 to 8000 and wherein at least one B is a residue from a difunctional polymer or copolymer wherein B has a molecular weight of 248 to 8000 comprising silicone repeat units of formula II

where $R_1$ and $R_2$ may be the same or different and are selected from the group consisting of hydrogen, alkyl, alkenyl, alkynyl, aryl, haloalkyl, haloalkenyl, haloalkynyl, haloaryl, heterocyclyl and haloheterocyclyl; preferably from alkyl, aryl and halosubstituted alkyl;

L is a difunctional linking group; and

T is a terminal group.

Preferably n is in the range of from 1 to 5, and even more preferably in the range of from 1 to 4, e.g. from 1 to 3 or 2 to 4.

Q is a polymerizable group which preferably comprises an ethylenically unsaturated moiety which can enter into a polymerization reaction. Preferably Q is a group of the formula A $$P_1-(Y)_m-(R'-X_1)_p- \quad (A)$$

wherein $P_1$ is a free-radical-polymerizable group;

Y is —CONHCOO—, —CONHCONH—, —OCONHCO—, —NHCONHCO—, —NHCO—, —CONH—, —NHCONH—, —COO—, —OCO—, —NHCOO— or —OCONH—;

m and p, independently of one another, are 0 or 1;

R' is a divalent radical of an organic compound having up to 20 carbon atoms;

$X_1$ is —NHCO—, —CONH—, —NHCONH—, —COO—, —OCO—, —NHCOO— or —OCONH—.

A free-radical-polymerizable group $P_1$ is, for example, alkenyl, alkenylaryl or alkenylarylenealkyl having up to 20 carbon atoms. Examples of alkenyl are vinyl, allyl, 1-propen-2-yl, 1-buten-2-, -3- and -4-yl, 2-buten-3-yl, and the isomers of pentenyl, hexenyl, octenyl, decenyl and undecenyl. Examples of alkenylaryl are vinylphenyl, vinyinaphthyl or allylphenyl. An example of alkenylarylenealkyl is o-, m-, or p-vinylbenzyl.

$P_1$ is preferably alkenyl or alkenylaryl having up to 12 carbon atoms, particularly preferably alkenyl having up to 8 carbon atoms, in particular alkenyl having up to 4 carbon atoms.

Y is preferably —COO—, —OCO—, —NHCONH—, —NHCOO—, —OCONH—, NHCO— or —CONH—, particularly preferably —COO—, —OCO—, NHCO— or —CONH—, and in particular, —COO— or —OCO—.

$X_1$ is preferably —NHCONH—, —NHCOO— or —OCONH—, particularly preferably —NHCOO— or —OCONH—.

In a preferred embodiment, the indices, m and p, are not simultaneously zero. If p is zero, m is preferably 1.

R' is preferably alkylene, arylene, a saturated bivalent cycloaliphatic group having 6 to 20 carbon atoms, arylenealkylene, alkylenearylene, alkylenearylenealkylene or arylenealkylenearylene.

Preferably, R' is a divalent radical having up to 12 carbon atoms, particularly preferably a divalent radical having up to 8 carbon atoms. In a preferred embodiment, R' is furthermore alkylene or arylene having up to 12 carbon atoms. A particularly preferred embodiment of R' is lower alkylene, in particular lower alkylene having up to 4 carbon atoms.

It is particularly preferred that Q be selected from the group consisting of acryloyl, methacryloyl, styryl, acrylamido, acrylamidoalkyl, urethanemethacrylate or any substituted derivatives thereof. Most preferably Q is a compound of formula A wherein $P_1$ is alkenyl of up to 4 carbon atoms, Y is —COO—, R' is alkylene of up to 4 carbon atoms, $X_1$ is —NHCOO— and m and p are each one.

Suitable groups or substituents for Q may be selected from: alkyl, alkenyl, alkynyl, aryl, halo, haloalkyl, haloalkenyl, haloalkynyl, haloaryl, hydroxy, alkoxy, alkenyloxy, aryloxy, haloalkoxy, haloalkenyloxy, haloaryloxy, amino, alkylamino, alkenylamino, alkynylamino, arylamino, acyl, aroyl, alkenylacyl, arylacyl, acylamino, alkylsulphonyloxy, arylsulphenyloxy, heterocyclyl, heterocycyloxy, heterocycylamino, haloheterocyclyl, alkoxycarbonyl, alkylthio, alkylsulphonyl, arylthio, arylsulphonyl, aminosulphonyl, dialkylamino and dialkylsulphonyl, having up to 10 carbon atoms.

The blocks B may be monomeric, oligomeric or polymeric. The molecular weights and chemical composition of each block B may be the same or different, provided that they fall within the molecular weight range specified above and that at least one B block is a residue comprising units of formula II. Blocks B may be hydrophobic or hydrophilic. When B is a hydrophobic block particularly preferred are difunctional residues derived from polysiloxanes and perfluorinated polyethers, when B is hydrophilic, particularly preferred are difunctional residues derived from poly (alkylene oxides) such as the polyethylene glycols or poly (cyclic ethers). In one embodiment it is preferred that the macromonomer of the present invention has at least two blocks B which are polysiloxanes.

At least one B block is a residue from a difunctional polymer or copolymer wherein B has a molecular weight of 248 to 8000, preferably of 248 to 6000 comprising silicone repeat units of formula II as hereinbefore defined, and preferably with end functionality as described below.

It is preferred that $R_1$ and $R_2$ are both having from 1 to 12 carbon atoms, more preferred from 1 to 6 carbon atoms. In particular, it is preferred that the silicone repeat units are as hereindescribed and wherein $R_1$ and $R_2$ are both $C_1$ to $C_6$ alkyl, more preferably methyl.

A difunctional polymer or copolymer from which B is derived contains an independently selected terminal functionality at each end which reacts with the precursor of the linking group L so that a covalent linkage is formed. The preferred terminal functionality is hydroxyl or amino. Such functionality may be joined to the siloxane units in B by means of an alkylene group or other non reactive spacer. Preferred terminal moieties are hydroxyalkyl, hydroxyalkoxyalkyl and alkylamino. Especially preferred hydroxyalkyls are hydroxypropyl and hydroxybutyl; especially preferred hydroxyalkoxyalkyls are hydroxyethoxyethyl and hydroxyethoxypropyl.

Preferred B blocks in formula I as specified above are of formula M

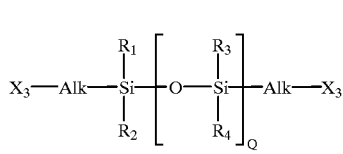

(M)

where Q is an integer from 5 to 100; Alk is alkylene having up to 20 carbon atoms, uninterrupted or interrupted by oxygen; the radicals $R_1$, $R_2$, $R_3$ and $R_4$, independently of one another, are alkyl, aryl or halosubstituted alkyl; and $X_3$ is —O— or —NH—.

In a preferred meaning, Q is an integer from 5 to 70, particularly preferably 8 to 50, in particular 10 to 28.

In a preferred meaning, the radicals $R_1$, $R_2$, $R_3$ and $R_4$ are, independently of one another, lower alkyl having up to 8 carbon atoms, particularly preferably lower alkyl having up to 4 carbon atoms, especially lower alkyl having up to 2 carbon atoms. A further particularly preferred embodiment of $R_1$, $R_2$, $R_3$ and $R_4$ is methyl.

Alkylene interrupted by oxygen is preferably lower alkylene-oxy-lower alkylene having up to 6 carbons in each of the two lower alkylene moieties, more preferably lower alkylene-oxy-lower alkylene having up to 4 carbons in each of the two lower alkylene moieties, examples being ethylene-oxy-ethylene or ethylene-oxy-propylene.

Halosubstituted alkyl is preferably lower alkyl substituted by one or more, especially up to three, halogens such as fluoro, chloro or bromo, examples being trifluoromethyl, chloromethyl, heptafluorobutyl or bromoethyl.

When B is derived from a perluorinated polyether it is preferably of formula N

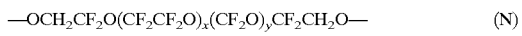

—OCH$_2$CF$_2$O(CF$_2$CF$_2$O)$_x$(CF$_2$O)$_y$CF$_2$CH$_2$O— (N)

wherein the CF$_2$CF$_2$O and CF$_2$O units may be randomly distributed or distributed as blocks throughout the chain and wherein x and y may be the same or different such that the molecular weight of the PFPE is in the range of from 242 to 4,000.

Preferably x in formula N is in the range of from 0 to 20, more preferably in the range from 8 to 12, and y is in the range from 0 to 25, more preferably in the range from 10 to 14.

When one or more of the blocks B is hydrophilic, these blocks are particularly preferably derived from poly (alkylene oxides), more preferably from poly(lower alkylene oxides), most preferred from the polyethylene glycols. It is most preferred that the B blocks are selected from blocks of formula II (or M) and poly(alkylene oxides), provided that at least one of the blocks is of formula II (or M). In two very preferred embodiments of the invention there are two B blocks in a macromonomer of formula I which are either both of formula II (or M), or one of which is of formula II (or M) while the other is derived from a poly(alkylene oxide), preferably from a poly(lower alkylene oxide), most preferred from polyethylene glycols. "Derived from a poly (alkylene oxide" in the context of the definition of the B blocks means that such a B block differs from a poly (alkylene oxide) in that the two terminal hydrogens have been abstracted from such poly(alkylene oxide). In order to exemplify this, B denotes, if derived from a polyethylene glycol, —(OCH$_2$CH$_2$)$_a$O— wherein a is the index indicating the number or repeating ethyleneoxy groups, hereinafter designated as "PEG".

The linking group L may be any difunctional moiety able to react with hydroxyl. Suitable precursors to L are α,ω- diepoxides, α,ω-diisocyanates, α,ω-diisothiocyanates, α,ω-diacylhalides, α,ω-dithioacylhalides, α,ω-dicarboxylic acids, α,ω-dithiocarboxylic acids, α,w-dianhydrides, α,ω-dilactones, α,ω-dialkylesters, α,ω-dihalides, α,ω-dialkyl ethers, α,ω-dihydroxymethylamides. It is preferred that the linking group be a bivalent residue (—C(O)—NH—R—NH—C(O)—) of a diisocyanate wherein R is a divalent organic radical having up to 20 carbon atoms.

The divalent radical R is, for example, alkylene, arylene, alkylenearylene, arylenealkylene or arylenealkylenearylene having up to 20 carbon atoms, a saturated bivalent cycloaliphatic group having 6 to 20 carbon atoms or cycloalkylenealkylenecycloalkylene having 7 to 20 carbon atoms.

In a preferred embodiment, R is alkylene, arylene, alkylenearylene, arylenealkylene or arylenealkylenearylene having up to 14 carbon atoms or a saturated divalent cycloaliphatic group having 6 to 14 carbon atoms. In a particularly preferred embodiment, R is alkylene or arylene having up to 12 carbon atoms or a saturated bivalent cycloaliphatic group having 6 to 14 carbon atoms.

In a preferred embodiment, R is alkylene or arylene having up to 10 carbon atoms or a saturated bivalent cycloaliphatic group having 6 to 10 carbon atoms.

In a particularly preferred meaning, R is a radical derived from a diisocyanate, for example from hexane 1,6-diisocyanate, 2,2,4-trimethylhexane 1,6-diisocyanate, tetramethylene diisocyanate, phenylene 1,4-diisocyanate, toluene 2,4-diisocyanate, toluene 2,6-diisocyanate, m- or p-tetramethylxylene diisocyanate, isophorone diisocyanate or cyclohexane 1,4-diisocyanate.

Aryl is a carbocyclic aromatic radical which is unsubstituted or substituted preferably by lower alkyl or lower alkoxy. Examples are phenyl, tolyl, xylyl, methoxyphenyl, t-butoxyphenyl, naphthyl and phenanthryl.

Arylene is preferably phenylene or naphthylene, which is unsubstituted or substituted by lower alkyl or lower alkoxy, in particular 1,3-phenylene, 1,4-phenylene or methyl-1,4-phenylene, 1,5-naphthylene or 1,8-naphthylene.

A saturated bivalent cycloaliphatic group is preferably cycloalkylene, for example cyclohexylene or cyclohexylene (lower alkylene), for example cyclohexylenemethylene, which is unsubstituted or substituted by one or more lower alkyl groups, for example methyl groups, for example trimethylcyclohexylenemethylene, for example the bivalent isophorone radical.

For the purposes of the present invention, the term "lower" in connection with radicals and compounds, unless defined otherwise, denotes, in particular, radicals or compounds having up to 8 carbon atoms, preferably having up to 4 carbon atoms.

Lower alkyl has, in particular, up to 8 carbon atoms, preferably up to 4 carbon atoms, and is, for example, methyl, ethyl, propyl, butyl, tert-butyl, pentyl, hexyl or isohexyl.

Alkylene has up to 12 carbon atoms and can be straight-chain or branched. Suitable examples are decylene, octylene, hexylene, pentylene, butylene, propylene, ethylene, methylene, 2-propylene, 2-butylene, 3-pentylene, and the like.

Lower alkylene is alkylene having up to 8 carbon atoms, particularly preferably up to 4 carbon atoms. Particularly preferred meanings of lower alkylene are propylene, ethylene and methylene.

The arylene unit in alkylenearylene or arylenealkylene is preferably phenylene, unsubstituted or substituted by lower alkyl or lower alkoxy, and the alkylene unit therein is preferably lower alkylene, such as methylene or ethylene, in particular methylene. These radicals are therefore preferably phenylenemethylene or methylenephenylene.

Lower alkoxy has, in particular, up to 8 carbon atoms, preferably up to 4 carbon atoms, and is, for example, methoxy, ethoxy, propoxy, butoxy, tert-butoxy or hexyloxy.

Arylenealkylenearylene is preferably phenylene(lower alkylene)phenylene having up to 8, in particular up to 4, carbon atoms in the alkylene unit, for example phenyleneethylenephenylene or phenylenemethylenephenylene.

Some examples of very preferred diisocyanates from which bivalent residues are derived include trimethylhexamethylenediisocyanate (TMHMDI), isophorone diisocyanate (IPDI), methylenediphenyl diisocyanate (MDI) and 1,6-hexamethylenediisocyanate (HMDI).

In Formula I, T is a univalent terminal group which is not polymerizable by free radicals but may contain other functionality. Particularly, preferred terminal groups are hydrogen, alkyl, substituted alkyl, aryl or substituted aryl. More preferred groups T are hydrogen, lower alkyl and phenyl.

Suitable groups or substituents for T may be selected from the same groups and substituents disclosed hereinbefore in the context of Q.

In preferred embodiments of the present invention there are provided macromonomers of formulae IIIA, IVA and VIA:

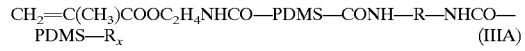
$$CH_2=C(CH_3)COOC_2H_4NHCO—PDMS—CONH—R—NHCO—$$
$$PDMS—R_x \quad (IIIA)$$

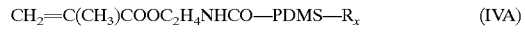
$$CH_2=C(CH_3)COOC_2H_4NHCO—PDMS—R_x \quad (IVA)$$

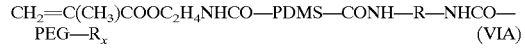
$$CH_2=C(CH_3)COOC_2H_4NHCO—PDMS—CONH—R—NHCO—$$
$$PEG—R_x \quad (VIA)$$

wherein PDMS is of formula M as hereinbefore defined, R is alkylene or arylene having up to 12 carbon atoms or a saturated bivalent cycloaliphatic group having 6 to 14 carbon atoms, and $R_x$ is hydrogen or lower alkyl. Of these compounds, those of formula IIIA and VIA are preferred, especially those of formula IIIA.

In further preferred embodiments of the present invention there are provided macromonomers of formulae III to VI:

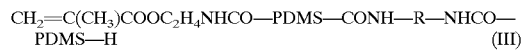
$$CH_2=C(CH_3)COOC_2H_4NHCO—PDMS—CONH—R—NHCO—$$
$$PDMS—H \quad (III)$$

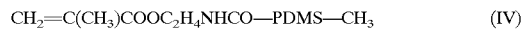
$$CH_2=C(CH_3)COOC_2H_4NHCO—PDMS—CH_3 \quad (IV)$$

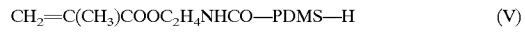
$$CH_2=C(CH_3)COOC_2H_4NHCO—PDMS—H \quad (V)$$

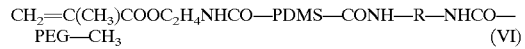
$$CH_2=C(CH_3)COOC_2H_4NHCO—PDMS—CONH—R—NHCO—$$
$$PEG—CH_3 \quad (VI)$$

wherein PDMS is the residue of a bishydroxyalkoxyalkylpolydimethylsiloxane of molecular weight in the range of from 800 to 3000 and R is the trimethylhexamethylene component of TMHMDI.

We have found that in general an appropriate modulus of elasticity and oxygen permeability can be obtained in polymers and copolymers which are derived from these macromonomers. This renders such polymers and copolymers particularly useful in the manufacture of comfortable, extended wear soft contact lenses.

The macromonomers of the present invention may be conveniently prepared from commercially available bishydroxyalkyl or bishydroxyalkoxyalkyl terminated poly(dimethylsiloxanes) (such as Shin-Etsu KF-6001 or Shin-Etsu X-22-1 60AS) by procedures well known in the art of polymer synthesis. These procedures typically involve mixing the bishydroxyalkyl or alkoxyalkyl terminated polydimethylsiloxane with a precursor to the polymerizable group (such as isocyanatoethyl methacrylate or methacryloylchloride) and with a precursor (such as trimethylhexamethylenediisocyanate) to the linking group (if any). Optionally, catalysts (such as dibutyltin dilaurate) and solvents may be used. Other reactive polymer blocks may be present (such as poly(ethylene glycol)). While the reactants may be mixed together at one time, they are preferably added sequentially to the polymerization mixture. It is particularly preferred that the precursor to the polymerizable group is slowly added to the precursor of the groups B before the precursor of the linking groups is added to the reaction mixture.

It will be appreciated that the above procedure may result in a mixture of monofunctionalised macromonomer of the present invention, and a proportion of difunctionalised and unfunctionalised material.

We have found that it is also possible to prepare the macromonomer of the present invention from a preformed monofunctional block. Such a monofunctional block may, by way of example, be a monofunctional siloxane or monofunctional poly(ethylene oxide), such as monomethyl terminated poly(ethylene oxide).

In another aspect, this invention provides a process for the production of polymers. The macromonomers of the present invention may be copolymerized or homopolymerized to afford transparent polymer in the presence of a suitable initiator. Standard methods well known in the art for effecting polymerization may be utilized, with free radical polymerization being preferred. Free radical polymerization can be simply carried out by radiating (using ultra-violet light) monomer mixtures containing a UV initiator, such as benzoin methyl ether, in an appropriate container or vessel. The mixture is irradiated for a sufficient time to enable polymerization between monomers to take place. Alternatively, thermal initiation using a thermal initiator such as azobisisobutyronitrile, can be employed.

The macromonomer can be converted to polymer neat or in the presence of one or more solvents and/or comonomers. While the structure of the macromonomer has the most significant effect on the resulting modulus, the choice of solvent and comonomer also has an effect. Useful solvents include those selected from the following classes: esters, alcohols, ethers, and halogenated solvents. Solvent concentrations of between 0–70% w/w, particularly 10–50% w/w in the polymerization mixture are desirable. Preferred solvents include acetates, particularly isopropyl acetate and tert-butyl acetate. Other useful solvents include chlorofluoroalkanes, such as trichlorotrifluoroethane, and perfluorinated alkanes, such as perfluoro-1,3-dimethylcyclohexane and the like.

Comonomers comprising one or more ethylenically unsaturated groups which can enter into a reaction to form a copolymer may be incorporated. It is preferred that the ethylenically unsaturated group be selected from the group consisting of acryloyl, methacryloyl, styryl, acrylamido, acrylamidoalkyl, urethanemethacrylate, or any substituted derivatives thereof.

A comonomer present in the novel polymer can be hydrophilic or hydrophobic or a mixture thereof. Suitable comonomers are, in particular, those which are usually used in the production of contact lenses and biomedical materials. A hydrophobic comonomer is taken to mean a monomer which typically gives a homopolymer which is insoluble in water and can absorb less than 10% by weight of water. Analogously, a hydrophilic comonomer is taken to mean a monomer which typically gives a homopolymer which is soluble in water or can absorb at least 10% by weight of water.

Suitable hydrophobic comonomers are, without limitation thereto, $C_1$–$C_{18}$alkyl and $C_3$–$C_{18}$cycloalkyl acrylates and methacrylates, $C_3$–$C_{18}$alkylacrylamides and -methacrylamides, acrylonitrile, methacrylonitrile, vinyl $C_1$–$C_{18}$alkanoates, $C_2$–$C_{18}$alkenes, $C_2$–$C_{18}$haloalkenes, styrene, (lower alkyl)styrene, lower alkyl vinyl ethers, $C_2$–$C_{10}$perfluoroalkyl acrylates and methacrylates and correspondingly partially fluorinated acrylates and methacrylates, $C_3$–$C_{12}$perfluoroalkylethylthiocarbonylaminoethyl acrylates and methacrylates, acryloxy- and methacryloxyalkylsiloxanes, N-vinylcarbazole, $C_1$–$C_{12}$alkyl esters of maleic acid, fumaric acid, itaconic acid, mesaconic acid and the like.

Preference is given, for example, to acrylonitrile, $C_1$–$C_4$alkyl esters of vinylically unsaturated carboxylic acids having 3 to 5 carbon atoms or vinyl esters of carboxylic acids having up to 5 carbon atoms.

Examples of suitable hydrophobic comonomers are methyl acrylate, ethyl acrylate, propyl acrylate, isopropyl acrylate, cyclohexyl acrylate, 2-ethylhexyl acrylate, methyl methacrylate, ethyl methacrylate, propyl methacrylate, butyl acrylate, vinyl acetate, vinyl propionate, vinyl butyrate, vinyl valerate, styrene, chloroprene, vinyl chloride, vinylidene chloride, acrylonitrile, 1-butene, butadiene, methacrylonitrile, vinyltoluene, vinyl ethyl ether, perfluorohexylethylthiocarbonylaminoethyl methacrylate, isobornyl methacrylate, trifluoroethyl methacrylate, hexafluoroisopropyl methacrylate, hexafluorobutyl methacrylate, tristrimethylsilyloxysilylpropyl methacrylate (hereinafter: Tris methacrylate), tristrimethylsilyloxysilylpropyl acrylate (hereinafter: Tris acrylate), 3-methacryloxy propylpentamethyldisiloxane and bis(methacryloxypropyl) tetramethyidisiloxane.

Preferred examples of hydrophobic comonomers are methyl methacrylate, Tris acrylate, Tris methacrylate and acrylonitrile.

Suitable hydrophilic comonomers are, without this being an exhaustive list, hydroxyl-substituted lower alkyl acrylates and methacrylates, acrylamide, methacrylamide, (lower alkyl)-acrylamides and -methacrylamides, ethoxylated acrylates and methacrylates, hydroxyl-substituted (lower alkyl) acrylamides and -methacrylamides, hydroxyl-substituted lower alkyl vinyl ethers, sodium vinylsulfonate, sodium styrenesulfonate, 2-acrylamido-2-methylpropanesulfonic acid, N-vinylpyrrole, N-vinyl-2-pyrrolidone, 2-vinyloxazoline, 2-vinyl-4,4'-dialkyloxazolin-5-one, 2- and 4-vinylpyridine, vinylically unsaturated carboxylic acids having a total of 3 to 5 carbon atoms, amino(lower alkyl)- (where the term "amino" also includes quatemary ammonium), mono(lower alkylamino)(lower alkyl) and di(lower alkylamino)(lower alkyl) acrylates and methacrylates, allyl alcohol and the like. Preference is given, for example, to N-vinyl-2-pyrrolidone, acrylamide, methacrylamide, hydroxyl-substituted lower alkyl acrylates and methacrylates, hydroxy-substituted (lower alkyl) acrylamides and -methacryl-amides and vinylically unsaturated carboxylic acids having a total of 3 to 5 carbon atoms.

Examples of suitable hydrophilic comonomers are hydroxyethyl methacrylate (HEMA), hydroxyethyl acrylate, hydroxypropyl acrylate, trimethylammonium 2-hydroxy propylmethacrylate hydrochloride (Blemer® QA, for example from Nippon Oil), dimethylaminoethyl methacrylate (DMAEMA), dimethylaminoethyl (meth)acrylamide, acrylamide, methacrylamide, N,N-dimethylacrylamide (DMA), allyl alcohol, vinylpyridine, glycerol methacrylate, N-(1,1-dimethyl-3-oxobutyl)acrylamide, N-vinyl-2-pyrrolidone (NVP), acrylic acid, methacrylic acid and the like.

Preferred hydrophilic comonomers are trimethylammonium 2-hydroxy propylmethacrylate hydrochloride, 2-hydroxyethyl methacrylate, dimethylaminoethyl methacrylate, trimethylammonium 2-hydroxypropylmethacrylate hydrochloride, N,N-dimethylacrylamide and N-vinyl-2-pyrrolidone.

As stated hereinbefore, suitable comonomers include fluorine- and silicon-containing alkyl acrylates and hydrophilic comonomers, which may be selected from a wide range of commercially available materials, and mixtures thereof. Particularly preferred comonomers include dihydroperfluoroalkyl acrylates, such as dihydroperfluorooctyl acrylate and 1,1-dihydroperfluorobutyl acrylate, trihydroperfluoroalkyl acrylates, tetrahydroperfluoroalkyl acrylates, tris(trimethylsilyloxy)propyl methacrylate or acrylate, and amine-containing comonomers, such as N,N-dimethylaminoethyl methacrylate, N,N-dimethyl acrylamide and N,N-dimethylaminoethyl-acrylamide. The preferred range for addition of individual comonomers into the formulation is from 0 to 60% by weight and most preferably 0 to 40% by weight of the formulation. Mixtures of macromonomers of formula I may also be used to make suitable copolymers with or without other comonomers.

Other macromonomers (monofunctional or difunctional) may also be incorporated with or without further comonomers. Difunctional macromonomers or comonomers may be optionally incorporated to control the degree of crosslinking in the polymer. Other macromonomers suitable for incorporation in the polymers of the present invention include those described in our copending Australian provisional applications PN2159, PN2160, PN2161 and PN2162.

A polymer network can, if desired, be reinforced by addition of a crosslinking agent, for example a polyunsaturated crosslinking comonomer. In this case, the term crosslinked polymers is used. The invention, therefore, furthermore relates to a crosslinked polymer comprising the product of the polymerization of a macromer of the formula (I), if desired with at least one vinylic comonomer and with at least one crosslinking comonomer.

Examples of typical crosslinking comonomers are allyl (meth)acrylate, lower alkylene glycol di(meth)acrylate, poly(lower alkylene) glycol di(meth)acrylate, lower alkylene di(meth)acrylate, divinyl ether, divinyl sulfone, di- and trivinylbenzene, trimethylolpropane tri(meth)acrylate, pentaerythritol tetra(meth)acrylate, bisphenol A di(meth)acrylate, methylenebis(meth)acrylamide, triallyl phthalate and diallyl phthalate.

If a crosslinking comonomer is used, the amount used is in the range of from 0.05 to 20 % of the expected total weight of polymer, preferably the comonomer is in the range of 0.1 to 10 %, and more preferably in the range of 0.1 to 2 %.

One preferred class of silicone-containing monomers which can function as either cross-linking agents or as comonomers is a poly(organosiloxane) polymer as described below

$CH_2=C(CH_3)COOC_2H_4NHCO—PDMS—OCNHC_2H_4OOCC(CH_3)=CH_2$ wherein PDMS is of formula M as hereinbefore defined or is the residue of a bishydroxyalkoxyalkylpolydimethylsiloxane of molecular weight in the range of from 248 to 3000.

According to a further aspect of the present invention there is provided a polymer produced by the process herein defined wherein the polymer is formed from at least one macromonomer as herein defined.

We have found that in general an appropriate modulus of elasticity and oxygen permeability for use as soft contact lenses can be obtained in polymers and copolymers which are derived from the macromonomers as herein defined.

According to a further aspect of the present invention there is provided a soft contact lens manufactured from polymers or copolymers as hereinbefore described. Soft contact lenses are crosslinked polymer disks with surfaces of differing radii of curvature. The radii are selected in combination with the refractive index of the polymer so that the desired optical correction is obtained and the inner surface of the lens matches the contour of wearers cornea. They are normally sold swollen by sterile saline.

By way of example, in the manufacture of such lenses the appropriate quantities of polymerizable monomers, solvent (if required) and photoinitiator are mixed together to form a polymerization mixture. The polymerization mixture is then flushed with nitrogen and the required quantity dispensed into the concave half of a polypropylene mould. The mould is closed and clamped and the assembly is placed into a UV irradiation cabinet equipped with UV lamps. The irradiation is performed for the required time and then the halves of the mould are separated. The polymerized lens is extracted in an appropriate solvent (e.g. an isopropyl or tert-butylacetate/fluorinated solvent mixture). The solvent is then extensively exchanged with an alcohol (e.g. isopropyl alcohol) and subsequently with saline to yield the product lens.

We have also found that in certain embodiments of the present invention, the polymers and polymeric materials may be suitable for use as corneal implants or onlays (which may be referred to as "artificial corneas"), cell growth substrates, materials for the attachment and growth of cells in vitro or in vivo, medical implants (such as implantable semipermeable membrane materials, tissue implants in cosmetic surgery, implants containing hormone secreting cells such as pancreatic islet cells, breast implants, artificial joints, and the like), and the like.

According to another aspect of this invention there is provided an ophthalmic device manufactured from polymers or copolymers as described herein. Artificial corneas may be produced according to the procedures already described for the production of soft contact lenses. Artificial corneas may be placed by way of conventional surgical techniques beneath, within, or through corneal epithelial tissue, or within the corneal stroma or other tissue layers of the cornea. Such implants may change the optical properties of the cornea (such as to correct visual deficiencies) and/or change the appearance of the eye, such as pupil coloration. A corneal implant may comprise an optical axis region which on implantation covers the pupil and provides visual acuity, and a region which surrounds the periphery of the optical axis region. The implant may have the same visual acuity across its dimensions.

It has been found that the flow of high molecular weight tissue fluid components such as proteins and glycoproteins (for example, growth factors, peptide and protein hormones, and proteins associated with the transport of essential metals), and the like across a corneal implant, that is, between epithelial cells and stromal cells and even the endothelial layer and beyond, is important for long term maintenance and viability of tissue anterior and posterior to a corneal implant. Accordingly a corneal implant is advantageously prepared with a porosity sufficient to allow passage therethrough of tissue fluid components having a molecular weight greater than about 10,000 daltons, thereby providing for a flux of tissue fluid components in addition to small molecular weight nutrients and respiratory gases between cells anterior of the implant and cells posterior thereof.

The porosity of the corneal implant may be provided by virtue of the material from which the implant is formed, that is, by the inherent porosity of the material. Alternatively, pores may be introduced into the polymers or copolymers according to this invention from which the implant is formed by various procedures well known in the art such as those described in WO 90/07575, WO 91/07687, U.S Pat. No. 5,244,799, U.S Pat. No 5,238,613, U.S. Pat. No 4,799,931 and U.S Pat. No. 5,213,721.

Regardless of the methods of formation of the requisite porosity of the implant of the invention, the implant preferably has a porosity sufficient to admit proteins and other biological macromolecules of a molecular weight up to and greater than 10,000 daltons, such as from 10,000 to 1,000, 000 daltons, but not sufficient to admit cells and thus tissue invasion into the optical axis region of the corneal onlay. Where porosity of the implant is provided by pores, the optical axis region comprises a plurality of pores, the number of which is not in any way limiting, but which is sufficient to provide flow of tissue components between the anterior and posterior regions of an implant.

The polymers and polymeric materials of this invention may support colonisation with tissue cells (e.g. vascular endothelial cells, fibroblasts, bone-derived cells etc) without the need for specific surface modifications in order to stimulate cell adhesion and growth. This is advantageous as processing costs can be minimised. Alternatively the polymers and polymeric materials according to this invention can be surface modified by techniques well known in the art such as radio frequency glow discharge plasma modification (see U.S. Pat. No 4,919,659 and PCT/AU89/00220) or radiation grafting or chemical treatment.

The polymers and polymeric materials of this invention may be surface coated with one or more components which promote the growth of tissue. For example, such materials include fibronectin, chondroitan sulphate, collagen, laminin, cell attachment proteins, antigelatine factor, cold insoluble globullin, chondronectin, epidermal growth factor, mussel adhesive protein and the like, and/or derivatives thereof, and mixtures thereof. Fibronectin, epidermal growth factor, and/ or derivatives, active fragments or mixtures thereof are particularly useful. Such surface coating may be applied after surface modification, as described above, if necessary.

The polymers and polymeric materials of this invention may also be used as cell growth substrates, such as tissue culture apparatus (such as dishes, bottles, trays and the like), in biological reactors (such as in the production of valuable proteins and other components by cell culture), in optical instruments, microscope slides and the like.

The polymers produced according to the present invention may be formed into other useful articles using conventional moulding and processing techniques as are well known in the art. The polymers may also find use in soft membrane materials, controlled drug release, gas separation membranes and ion transport membranes.

Throughout this specification and the claims which follow, unless the context requires otherwise, the word "comprise", or variations such as "comprises" or "comprising", will be understood to imply the inclusion of a stated integer or group of integers but not the exclusion of any other integer or group of integers.

The present invention is further described in the following non-limiting examples. If not otherwise specified, all parts are by weight. Temperatures are in degrees Celsius. Molecular weights of macromers or polymers are number average molecular weights if not otherwise specified.

EXAMPLE 1

The example illustrates the synthesis of a macromonomer of formula III: Into a 20 mL vial is placed 4.999 g of bishydroxyalkoxyalkyl terminated PDMS of molecular weight 2158 (commercially available as Shin-Etsu KF-6001) and 0.357 g of freshly distilled isocyanatoethyl methacrylate. After stirring the mixture vigorously for several minutes, 0.025 g of dibutylin dilaurate is added. The mixture is then stirred overnight. An infrared spectrum is recorded to confirm the disappearance of the isocyanate peak. To the reaction mixture is then added 0.486 g of distilled trimethylhexamethylene diisocyanate and 0.010 g of dibutylin dilaurate. Again, the mixture is stirred overnight. A further 5.000 g of bishydroxyalkoxyalkyl terminated PDMS is then added to the mixture with 0.040 g of dibutylin dilaurate. The flask is stirred vigorously overnight. Again an infrared spectrum is recorded to confirm the disappearance of isocyanate. This procedure produces a macromonomer with a high component of Formula III.

EXAMPLE 2

This example illustrates the synthesis of a macromonomer of formula IV: Into a 100 mL conical flask is placed 27.505 g of a commercially available monocarbinol terminated polydimethylsiloxane of approximate molecular weight 1420 (commercially available from United Chemical Technologies, Petrarch Silanes and Silicones) and 3.009 g of freshly distilled isocyanatoethyl methacrylate. After stirring vigorously for several minutes, 0.015 g of dibutyltin dilaurate is added. The mixture is then stirred overnight. An infrared spectrum is recorded to confirm the disappearance of the isocyanate peak.

EXAMPLE 3

This example illustrates the synthesis of a macromonomer of the formula VI: Into a 20 mL vial is placed 1.263 g of a commercially available monomethyl ether of polyethyleneglycol of molecular weight 350 (obtained from Polysciences, Inc in Warrington, Pa.). To this is added 0.760 g of freshly distilled trimethylhexamethylene diisocyanate and the mixture is stirred for several minutes. A catalyst, dibutyltin dilaurate (0.006 g), is then added and the mixture is stirred overnight. To this is then added 7.624 g of commercially available hydroxyalkoxy terminated polydimethylsiloxane of molecular weight 2158 (Shin Etsu KF-6001) and a further 0.009 g of dibutyltin dilaurate. After stirring overnight, an infrared spectrum is recorded to confirm the disappearance of the isocyanate peak, and freshly distilled isocyanatoethyl methacrylate (0.563 g) is added to the mixture. The mixture is again stirred overnight and the disappearance of the isocyanate peak confirmed by infrared spectrometry. This procedure produces a macromonomer with a high component of Formula VI.

EXAMPLE 4

Into a 20 mL vial is placed 5.007 g of a commercially available bishydroxyalkoxy terminated polydimethylsiloxane of molecular weight 987 (commercially available as Shin-Etsu X-22-160AS) and 1.574 g of freshly distilled isocyanatoethyl methacrylate. After stirring vigorously for several minutes, 0.033 g of dibutyltin dilaurate is added. The mixture is then stirred overnight. An infrared spectrum is recorded to confirm the disappearance of the isocyanate peak.

EXAMPLE 5

Into a 20 mL vial is placed 10.000 g of a commercially available bishydroxyalkoxy terminated polydimethylsiloxane of molecular weight 2158 (commercially available as Shin-Etsu KF-6001) and 1.438 g of freshly distilled isocyanatoethyl methacrylate. After stirring vigorously for several minutes, 0.011 g of dibutyltin dilaurate is added. The mixture is then stirred overnight. An infrared spectrum is recorded to confirm the disappearance of the isocyanate peak.

EXAMPLE 6

The following composition is placed in a polypropylene lens mold and polymerized for 3 hours under irradiation from 365 nm UV lamps. (All parts are parts by weight).

| | |
|---|---|
| Macromonomer of Example 1 | 55.6 parts |
| N,N-Dimethylacrylamide | 15.9 parts |
| Dihydroperfluorooctyl acrylate | 8.0 parts |
| Benzoin methyl ether | 0.3 parts |
| Isopropyl acetate | 20.6 parts |

Lenses of the polymer were extracted at room temperature in PF5060 (a commercially available perfluorinated solvent) for three hours, then placed in isopropyl acetate (IPAc) overnight, then in a 50/50 (v/v) mix of IPAc—isopropyl alcohol (IPA) for three hours and into fresh IPA for a further three hours. The lenses were dried overnight in a vacuum oven on filter paper before being hydrated in saline for several days. After extraction and hydration, the oxygen transmissibility is measured on the resulting clear polymer lens and shown to be 104 Barrers. The modulus is 1.0 MPa. These values are suitable for an extended wear soft contact lens. The water content is 19%

The extraction procedure of this example was used in the following examples.

EXAMPLE 7

The following composition is placed in a polypropylene lens mold and polymerized for 3 hours under irradiation from 365 nm UV lamps. (All parts are parts by weight).

| | |
|---|---|
| Macromonomer of Example 1 | 67.8 parts |
| N,N-Dimethylaminoethyl methacrylate | 12.1 parts |
| Benzoin methyl ether | 0.3 parts |
| Isopropyl acetate | 20.1 parts |

After extraction and hydration using the procedure of example 6, the water content is measured on clear polymeric lenses and is found to be 17%.

EXAMPLE 8

The following composition is placed in a polypropylene lens mold and polymerised for three hours under irradiation from 365 nm UV lamps. (All parts are parts by weight).

| | |
|---|---|
| Macromonomer of Example 2 | 55.7 parts |
| Dimethylacrylamide | 16.1 parts |
| Dihydroperfluorooctyl acrylate | 8.1 parts |
| Isopropyl acetate | 20.1 parts |
| Darocur 1173 | 0.3 parts |

The resulting lenses were extracted in PF5060 at 37° C. for three hours, then in isopropyl acetate, also at 37° C., overnight. They were then exchanged into isopropyl alcohol for three hours at 37° C. before being dried overnight in a vacuum oven. The lenses were then hydrated in saline solution for several days. The oxygen transmissibility is measured on the resulting clear polymeric lenses and shown to be 117 Barrers. The modulus is 0.55 MPa. The water content was found to be 22.5%.

EXAMPLE 9

The following composition is placed in a polypropylene lens mold and polymerised for three hours under irradiation from 365 nm UV lamps. (All parts are parts by weight).

| | |
|---|---|
| Macromonomer of Example 1 | 45.2 parts |
| Macromonomer of Example 4 | 3.4 parts |
| Dimethylacrylamide | 13.9 parts |
| Dihydroperfluorooctyl acrylate | 7.3 parts |
| Isopropyl acetate | 30.2 parts |
| Benzoin methyl ether | 0.3 parts |

After extraction and hydration using the procedure of Example 6, the oxygen transmissibility is measured on the resulting clear polymeric lenses and shown to be 103 Barrers. The modulus is 1.22 MPa. The water content was found to be 20%.

EXAMPLE 10

The following composition is placed in a polypropylene lens mold and polymerised for three hours under irradiation from 365 nm UV lamps. (All parts are parts by weight).

| | |
|---|---|
| Macromonomer of Example 1 | 45.2 parts |
| Macromonomer of Example 5 | 4.0 parts |
| Dimethylacrylamide | 16.0 parts |
| Dihydroperfluorooctyl acrylate | 8.0 parts |
| Isopropyl acetate | 20.0 parts |
| Darocur 1173 | 0.3 parts |

After extraction and hydration using the procedure of Example 6, the oxygen transmissibility is measured on the resulting clear polymeric lenses and shown to be 100 Barrers. The modulus is 1.72 MPa. The water content was found to be 19.6%.

EXAMPLE 11

The following composition is placed in a polypropylene lens mold and polymerised for three hours under irradiation from 365 nm UV lamps. (All parts are parts by weight).

| | |
|---|---|
| Macromonomer of Example 3 | 68.0 parts |
| Dimethylacrylamide | 12.1 parts |
| Isopropyl acetate | 20.0 parts |
| Benzoin methyl ether | 0.3 parts |

After extraction and hydration using the procedure of Example 6, the water content was found to be 19.4%.

EXAMPLE 12

This example illustrates the synthesis of a macromonomer of formula V: Into a 200 mL vial is placed 10.004 g of bis hydroxyalkoxyalkyl terminated polydimethylsiloxane (Shinetsu KF-6001) and 0.7193 g of freshly distilled isocyanatoethyl methacrylate. After stirring the mixture vigorously for several minutes, 0.042 g of dibutyltin dilaurate is added. The mixture is then stirred overnight. An infrared spectrum is then recorded to confirm the disappearance of the isocyanate peak.

EXAMPLE 13

The following composition is placed in a polypropylene lens mold and polymerised for three hours under irradiation from 365 nm UV lamps. (All parts are parts by weight).

| | |
|---|---|
| Macromonomer of Example 12 | 55.9 parts |
| Dimethylacrylamide | 16.3 parts |
| Dihydroperfluorooctyl acrylate | 8.0 parts |
| Isopropyl acetate | 19.8 parts |
| Darocur 1173 | 0.3 parts |

After extraction and hydration using the procedure of Example 8, the oxygen transmissibility is measured on the resulting clear polymeric lenses and found to be 93 Barrers. The modulus is 1.92 MPa. The water content was found to be 15.5 %.

EXAMPLE 14

The following procedure was used to evaluate cell attachment and growth of corneal epithelial cells and stromal fibroblast cells on the polymers:

Bovine corneal epithelial cells (BCEP) and bovine corneal stromal fibroblasts (BCF), of between culture passage numbers 2–4, were used to determine the relative cell attachment and growth performance of each copolymer. Test polymers were cut into 6 mm diameter disks using a sterile Dermapunch (Registered trademark), with each sample prepared in triplicate. Replicate polymer samples were transferred to individual wells of a 96-well format tissue culture polystyrene (TCPS) tray and left overnight at room temperature in a phosphate-buffered saline solution containing 60 µg/ml penicillin and 100 µg/ml streptomycin. Cells were seeded onto each sample surface, including replicates of TCPS alone, at a density of $5\times10^3$ cells/well and cultured for seven days in a culture medium containing Dulbecco'minimal Essential Medium and Ham's F 12 (50:50, v/v) supplemented with 5 µg/ml insulin, 5 µg/ml transferring, 5 µng/ml selenious acid, 60 µg/mi penicillin and 100 µg/ml streptomycin and foetal bovine serum (with BCEp cells, 20% (v/v) serum was used but with BCF cells, 10% (v/v) was used). These cultures were maintained at 370° C. in a humidified atmosphere of 5% $CO_2$ in air. The culture medium was changed every second day. To determine the relative cell numbers present on each sample at the completion of the 7 day culture period, the cells were fixed with formol-saline and then stained with methylene blue (1% w/v in borate buffer, pH 8.4). The relative number of cells was determined from the adsorbed dye, calorimetrically on an ELISA plate-reader, and the adsorbances were expressed as a mean (±SD) percentage of the absorbance value obtained for cells grown on the TCPS control surface after the same period of time.

The following results were found. Bovine corneal epithelial cells attached and grew on the polymer formulations of Example 6 indicating that these polymers are suitable for the attachment and growth of corneal epithelial cells and tissue. Bovine corneal stromal fibroblasts attached and grew on the polymer formulations of Example 6 and the number of cells present on the polymer surfaces was 63% of that seen on the TCPS surface, after 7 days of culture.

These data indicate that the polymers according to this invention are suitable for application in artificial cornea and other implants as well as cell attachment and growth substrata.

Those skilled in the art will appreciate that the invention described herein is susceptible to variations and modifications other than those specifically described. It is to be understood that the invention includes all such variations and modifications which fall within the its spirit and scope. The invention also includes all of the steps, features, compositions and compounds referred to or indicated in this specification, individually or collectively, and any and all combinations of any two or more of said steps or features.

We claim:

1. A macromonoer of the formula I:

$$Q-B(L-B)_nT \qquad (I)$$

wherein n is zero or at least 1.0;

Q is a polymerizable group of the formula A

wherein $P_1$ is a free-radical-polymerizable group;

Y is —CONHCOO—, CONHCONH—, OCONHCO—, —NHCONHCO—, —NHCO—, —CONH—, —NHCONH—, —COO—, —OCO—, —NHCOO— or —OCONH—;

m an p, independently of one another, are 0 or 1;

R' is a divalent radical of an organic compound having up to 20 carbon atoms;

$X_1$ is —NHCO—, —CONH—, —NHCONH—, —COO—, —OCO—, —NHCOO— or —OCONH—;

B may be the same or different and is a difunctional block of moleculer weight in the range of from 100 to 8000 and wherein at least one B is a residue from a difunctional polymer or copolymer wherein B has a molecular weight of 248 to 8000 comprising units for formula M

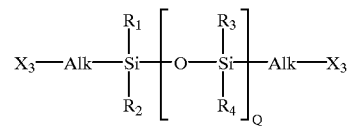

wherein Q is an integer from 5 to 100; Alk is alkylene having up to 20 carbon atoms, uninterrupted or interrupted by oxygen; the radicals $R_1$, $R_2$, $R_3$ and $R_4$, independently of one another, are lower alkyl having up to 8 carbon atoms, carbocyclic aromatic radicals, or lower alkyl substituted by one or more halogens; and $X_3$ is —O— or —NH—, L is a difuncational linking group whites a bivalent residue (—C(O)—NH—R—NH—C(O)—) of a diisocyanate wherein R is a divalent organic radical having up to 20 carbon atoms; and T is a univalent terminal group which is not polymerizable by free radicals.

2. A macromonomer according to claim 1 wherein n is in the range of from 1 to 5.

3. A macromonomer according to either claim 1 wherein n is in the range of from 2 to 4.

4. A macromonomer according to claim 1 wherein at least one B is a hydrophobic block derived from the group consisting of polysiloxanes and perfluorinated polyethers.

5. A macromonomer according to claim 1 wherein at least one B is hydrophilic.

6. A macromonomer according to claim 1 wherein at least one B is a hydrophilic block derived from a polyalkylene oxide or a poly(cyclic)ether.

7. A macromonomer according to claim 1 wherein the macromonomer comprises at least two blocks B which are polysiloxanes.

8. A macromonomer according to claim 1 wherein the bivalent residue L is derived from a diisocyanate selected from the group consisting of trimethylhexamethylenediisocyanate (TMHMDI), isophorone diisocyanate (IPDI), methylenediphenyl diisocyanate (MDI) and 1,6-hexamethylenediisocyanate (HMDI).

9. A macromonomer according to claim 1 wherein T is selected from the group consisting of hydrogen, alkyl and aryl.

10. A macromonomer according to claim 1 which is of formula III

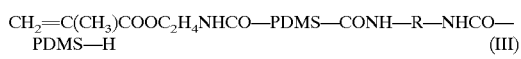

CH₂=C(CH₃)COOC₂H₄NHCO—PDMS—CONH—R—NHCO—PDMS—H (III)

wherein PDMS is the residue of a bishydroxyalkoxyalkylpolydimethylsiloxane of molecular weight in the range of from 800 to 3000 and R is the trimethylhexamethylene component of TMHMDI.

11. A process for producing a macromonomer of the formula I:

Q—B(L—B)ₙT (I)

wherein n is zero or at least 1.0;
Q is a polymerizable group of the formula A

P₁—(Y)ₘ—(R'—X₁)ₚ— (A)

wherein P₁ is a free-radical-polymerizable group;
Y is —CONHCOO—, CONHCONH—, OCONHCO—, —NHCONHCO—, —NHCO—, —CONH—, —NHCONH—, —COO—, —OCO—, —NHCOO— or —OCONH—;
m and p, independently of one another, are 0 or 1;
R' is a divalent radical of an organic compound having up to 20 carbon atoms;
X₁ is —NHCO—, —CONH—, —NHCONH—, —COO—, —OCO—, —NHCOO— or—OCONH—;
B may be the same or different and is a difunctional block of molecular weight in the range of from 100 to 8000 and wherein at least one B is a residue from a difunctional polymer or copolymer wherein B has a molecular weight of 248 to 8000 comprising units for formula M (M)

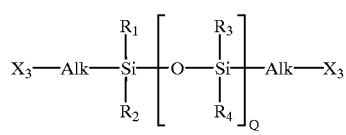

wherein Q is an integer from 5 to 100; Alk is alkylene having up to 20 carbon atoms, uninterrupted or interrupted by oxygen; the radicals R₁, R₂, R₃ and R₄, independently of one another, are lower alkyl having up to 8 carbon atoms, carbocyclic aromatic radicals, or lower alkyl substituted by one or more halogens; and X₃ is —O— or —NH—,
L is a difuntional linking group which is a bivalent residue (—C(O)—NH—R—NH—C(O)—) of a diisocyanate wherein R is a divalent organic radical having up to 20 carbon atoms; and
T is a univalent terminal group which is not polymerizable by free radicals, wherein said process comprises the step of mixing a bishydroxyalkyl or alkoxy alkyl terminated polydimethylsiloxane with a precursor to said polymerizable group.

12. The process of claim 11 wherein said process further comprises the step of mixing a precursor to said linking group.

13. A process for producing a polymer, comprising the step of polymerizing a macromonomer of the formula I:

Q—B(L—B)ₙT (I)

wherein n is zero or at least 1.0;
Q is a polymerizable group of the formula A

P₁—(Y)ₘ—(R'—X₁)ₚ— (A)

wherein P₁ is a free-radical-polymerizable group;
Y is —CONHCOO—, CONHCONH—, OCONHCO—, —NHCONHCO—, —NHCO—, —CONH—, —NHCONH—, —COO—, —OCO—, —NHCOO— or —OCONH—;
m and p, independently of one another, are 0 or 1;
R' is a divalent radical of an organic compound having up to 20 carbon atoms;
X₁ is —NHCO—, —CONH—, —NHCONH—, —COO—, —OCO—, —NHCOO— or —OCONH—;
B may be the same or different and is a difunctional block of molecular weight in the range of from 100 to 8000 and wherein at least one B is a residue from a difunctional polymer or copolymer wherein B has a molecular weight of 248 to 8000 comprising units for formula M (M)

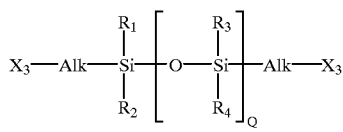

wherein Q is an integer from 5 to 100; Alk is alkylene having up to 20 carbon atoms, uninterrupted or interrupted by oxygen; the radicals R₁, R₂, R₃ and R₄, independently of one another, are lower alkyl having up to 8 carbon atoms, carbocyclic aromatic radicals or lower alkyl substituted by one or more halogens; and X₃ is —O— or —NH—,
L is a difuntional linking group which is a bivalent residue (—C(O)—NH—R—NH—C(O)—) of a diisocyanate wherein R is a divalent organic radical having up to 20 carbon atoms; and
T is a univalent terminal group which is not polymerizable by free radicals.

14. The process for claim 13 wherein said polymerizing process copolymerizes said macromonomer.

15. The process of claim 13 wherein said polymerizing process homopolymerizies said macromonomer.

16. The process of claim 15 wherein said macromonomer is polymerized in the presence of at least one solvent.

17. The process of claim 16 wherein said solvent is selected from the group consisting of esters, alcohols, ethers, and halogenated solvents.

18. The process of claim 16 wherein said solvent is selected from the group consisting of isopropyl acetate, tert-butyl acetate, 2-(trifluoromethyl)-2-propanol, trichlorotirfluoroethane and perfluoro-11,3-dimeythylcyclohexane.

19. The process of claim 14 wherein said macromonomer is copolymerized with at least one comonomer comprising one or more ethylenically unsaturated groups selected from the group consisting of acryloyl, methacryloyl, styryl, acrylamido, acrylamidoalkyl, urethanemethacrylate, or any substituted derivatives thereof, other macromonomers of claim 1, and mixtures thereof.

20. The process of claim 19, wherein the comonomer is selected from the group consisting of dihydroperfluoroocyl acrylate, 1,1-dihydroperfluorobutyl acrylate, tris (trimethylsilyloxy)propyl methacrylate or acrylate, amine-containing comonomers, and mixtures thereof.

21. The process of claim 14 wherein the macromonomer is copolymerized with at least one comonomer wherein each comonomer is present in the polymerization formulation in the range of from 0 to 60 parts.

22. The process of claim 14 wherein the macromonomer is copolymerized with at least one comonomer wherein each comonomer is present in the polymerization formulation in the range of from 0 to 40 parts.

23. A polymer comprising a macromonomer and one or more of a hydrophobic comonomer, a hydrophilic comonomer and a crosslinking comonomer, wherein the hydrophobic comonomer is selected from $C_1$–$C_{18}$ alkyl and $C_3$–$C_{18}$ cycloalkyl acrylates and methacrylates, $C_3$–$C_{18}$ alkylacrylamides and methacrylamides, acrylonitriles, methacrylonitrile, vinyl $C_1$–$C_{18}$ alkanoates, $C_2$–$C_{18}$ alkenes, $C_2$–$C_{18}$ haloalkanes, styrene, (lower alkyl)styrene, lower alkyl vinyl ethers, $C_2$–$C_{10}$ perfluoroalkyl acrylates and methacrylates and correspondingly partially fluorinated acrylates and methacrylates, $C_3$–$C_{12}$ perfluoroalkylethylthiocarbonylaminoethyl acrylates and methacrylates, acryloxy- and methacryloxyalkylsiloxanes, N-vinylcarbazole, $C_1$–$C_{12}$ alkylesters of maleic acid, fumaric acid, itaconic acid and mesaconic acid, wherein the hydrophilic comonomer is selected from hydroxy-substituted lower alkyl acrylates and methacrylates, acrylamide, methacrylamide, (lower alkyl)acrylamides and -methacrylamides, ethoxylated acrylates and methacrylates, hydorxy-substituted (lower alkyl) acrylamides and -methacrylamides, hydroxy-substituted lower alkyl vinyl ethers, sodium vinylsulfonate, sodium styrenesulfonate, 2-acruylamido-2-methylpropanesulfonic acid, N-vinylpyrrole, N-vinyl-2-pyrolidone, 2-vinyloxazoline, 2-vinyl-4,4'-dialkyloxazolin-5-one, 2- and 4-vinylpyridine, vinylically unsaturated carboxylic acids having a total of 3 to 5 carbon atoms, amino(lower alkyl)-, quaternary ammonium(lower alkyl)-, mono(lower alkylamino)(lower alkyl) and di(lower alkylamino)(lower alkyl) acrylates and methacrylates, and allyl alcohol, and wherein the crosslinking comonomer is selected from allyl(meth)acrylate, lower alkylene glycol di(meth)acrylate, poly(lower alkylene)glycol di(meth)acrylate, lower alkylene di(meth)acrylate, divinyl ether, divinyl sulfone, di- and trivinylbenzene, trimethylolpropane, tri(meth)acrylate, pentaerythritol tetra(meth)acrylate, bisphenol A di(meth)acrylate, methylenebis(meth)acrylamide, triallyl phthalate and diallyl phthalate, and wherein said macromonomer is of the formula I:

Q—B(L—B)$_n$T (I)

wherein n is zero or at least 1.0;
Q is a polymerizable group of the formula A

P$_1$—(Y)$_m$—(R'—X$_1$)$_p$— (A)

wherein P$_1$ is a free-radical-polymerizable group;
Y is —CONHCOO—, CONHCONH—, OCONHCO—, —NHCONHCO—, —NHCO—, —CONH—, —NHCONH—, —COO—, —OCO—, —NHCOO— or —OCONH—;

m and p, independently of one another, are 0 or 1;
R' is a divalent radical of an organic compound having up to 20 carbon atoms;
X$_1$ is —NHCO—, —CONH—, —NHCONH—, —COO—, —OCO—, —NHCOO— or—OCONH—;

B may be the same or different and is a difunctional block of molecular weight in the range of from 100 to 8000 and wherein at least one B is a residue from a difunctional polymer or copolymer wherein B has a molecular weight of 248 to 8000 comprising units for formula M

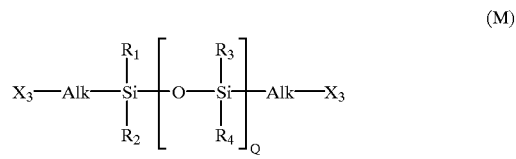

(M)

wherein Q is an integer from 5 to 100; Alk is alkylene having up to 20 carbon atoms, uninterrupted or interrupted by oxygen; the radicals R$_1$, R$_2$, R$_3$ and R$_4$, independently of one another, are lower alkyl having up to 8 carbon atoms, carbocyclic aromatic radicals or lower alkyl substituted by one or more halogens; and X$_3$ is —O— or —NH—, L is a difunational linking group which is a bivalent residue (—C(O)—NH—R—NH—C(O)—) of a diisocyanate wherein R is a divalent organic radical having up to 20 carbon atoms; and T is a univalent terminal group which is not polymerizable by free radicals.

24. An ophthalmic device comprising a polymer of claim 23.

25. An ophthalmic device according to claim 24 is a contact lens.

26. A process for producing a contact lens wherein said process comprises the steps of:

(a) mixing at least one macromonomer according to any one of claims 1 to 10 with an optional solvent, a photoinitiator, an optional comonomer to form a polymerization mixture, (b) flushing the polymerization mixture with nitrogen;

(c) charging the polymerization mixture into a concave half of a mold;

(d) closing and clamping the charged mold;

(e) irradiating the charged mold with UV radiation; and wherein said contact lens comprises a reaction product comprising a macromonomer and one or more of a hydrophobic comonomer, a hydrophilic comonomer and a crosslinking comonomer, wherein the hydrophobic comonomer is selected from $C_1$–$C_{18}$ alkyl and $C_3$–$C_{18}$ cycloalkyl acrylates and methacrylates, $C_3$–$C_{18}$ alkylacrylamides and methacrylamides, acrylonitriles, methacrylonitrile, vinyl $C_1$–$C_{18}$ alkanoates, $C_2$–$C_{18}$ alkenes, $C_2$–$C_{18}$ haloalkanes, styrene, (lower alkyl)styrene, lower alkyl vinyl ethers, $C_2$–$C_{10}$ perfluoroalkyl acrylates and methacrylates and correspondingly partially fluorinated acrylates and methacrylates, $C_3$–$C_{12}$ perfluoroalkylethylthiocarbonylaminoethyl acrylates and methacrylates, acryloxy- and methacryloxyalkylsiloxanes, N-vinylcarbazole, $C_1$–$C_{12}$ alkylesters of maleic acid, fumaric acid, itaconic acid and mesaconic acid, wherein the hydrophilic comonomer is selected from hydroxy-substituted lower alkyl acrylates and methacrylates, acrylamide, methacrylamide, (lower alkyl)acrylamides and -methacrylamides, ethoxylated acrylates and methacrylates, hydorxy-substituted (lower alkyl) acrylamides and -methacrylamides, hydroxy-substituted lower alkyl vinyl ethers, sodium vinylsulfonate, sodium styrenesulfonate, 2-acruylamido-2-methylpropanesulfonic acid, N-vinylpyrrole, N-vinyl-2-pyrolidone, 2-vinyloxazoline, 2-vinyl-4,4'-dialkyloxazolin-5-one, 2- and 4-vinylpyridine, vinylically unsaturated carboxylic acids having a total of 3 to 5 carbon atoms, amino(lower alkyl)-, quaternary ammonium(lower alkyl)-, mono(lower alkylamino)(lower alkyl) and di(lower alkylamino)(lower alkyl) acrylates and methacrylates, and allyl alcohol, wherein the crosslinking comonomer is selected from allyl(meth)acrylate, lower alkylene glycol di(meth)acrylate, poly(loer alkylene)glycol di(meth)acrylate, lower alkylene di(meth)acrylate, divinyl ether, divinyl sulfone, di- and trivinylbenzene, trimethylolpropane, tri(meth)acrylate, pentaerythritol tetra(meth)acrylate, bisphenol A di(meth)acrylate, methylenebis(meth)acrylamide, triallyl phthalate and diallyl phthalate, and wherein said macromonomer is of the formula I:

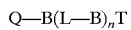  Q—B(L—B)$_n$T  (I)

wherein n is zero or at least 1.0;
Q is a polymerizable group of the formula A

  P$_1$—(Y)$_m$—(R'—X$_1$)$_p$—  (A)

wherein P$_1$ is a free-radical-polymerizable group;
Y is —CONHCOO—, CONHCONH—, OCONHCO—, —NHCONHCO—, —NHCO—, —CONH—, —NHCONH—, —COO—, —OCO—, —NHCOO— or —OCONH—;

m and p, independently of one another, are 0 or 1;
R' is a divalent radical of an organic compound having up to 20 carbon atoms;
X$_1$ is —NHCO—, —CONH—, —NHCONH—, —COO—, —OCO—, —NHCOO— or —OCONH—;
B may be the same or different and is a difunctional block of molecular weight in the range of from 100 to 8000 and wherein at least one B is a residue from a difunctional polymer or copolymer wherein B has a molecular weight of 248 to 8000 comprising units for formula M

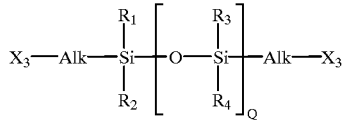

(M)

wherein Q is an integer from 5 to 100; Alk is alkylene having up to 20 carbon atoms, uninterrupted or interrupted by oxygen; the radicals R$_1$, R$_2$, R$_3$ and R$_4$, independently of one another, are lower alkyl having up to 8 carbon atoms, carbocyclic aromatic radicals or lower alkyl substituted by one or more halogens; and X$_3$ is —O— or —NH—, L is a difuntional linking group which is a bivalent residue (—C(O)—NH—R—NH—C(O)—) of a diisocyanate wherein R is a divalent organic radical having up to 20 carbon atoms; and T is a univalent terminal group which is not polymerizable by free radicals.

27. A soft contact lens manufactured from a polymer produced by a process according to claim 13.

28. A soft contact lens comprising a polymerized macromonomer of claim 1.

29. An artificial cornea manufactured from a polymer produced by a process according to claim 13.

30. An artificial cornea comprising a polymerized macromonomer of claim 1.

\* \* \* \* \*